G. W. MASCORD.
MOTOR VEHICLE.
APPLICATION FILED FEB. 5, 1910.

963,609.

Patented July 5, 1910.

UNITED STATES PATENT OFFICE.

GEORGE WILLIAM MASCORD, OF LONDON, ENGLAND.

MOTOR-VEHICLE.

963,609.  Specification of Letters Patent.  Patented July 5, 1910.

Application filed February 5, 1910. Serial No. 542,285.

*To all whom it may concern:*

Be it known that I, GEORGE WILLIAM MASCORD, a subject of the King of Great Britain and Ireland, residing at 5 The Crescent, Barnes, London, S. W., England, mechanician, have invented certain new and useful Improvements Relating to Motor-Vehicles, of which the following is a specification.

This invention relates to motor vehicles, and especially to combined driving and steering gear.

The several objects of the invention are,—first, to provide a practical combination by which traction wheels of vehicles may be both propelled and steered;—second, to provide a combination of the character stated, mechanically constructed and located to produce the most efficient and satisfactory results;—third, to provide a mechanical structure of the character stated, that is self protective from grit, water etc.; and fourth, to provide a mechanism of the character stated, that is, durable and easily accessible for repair and for replacing the principal wearing parts.

Figure 1:
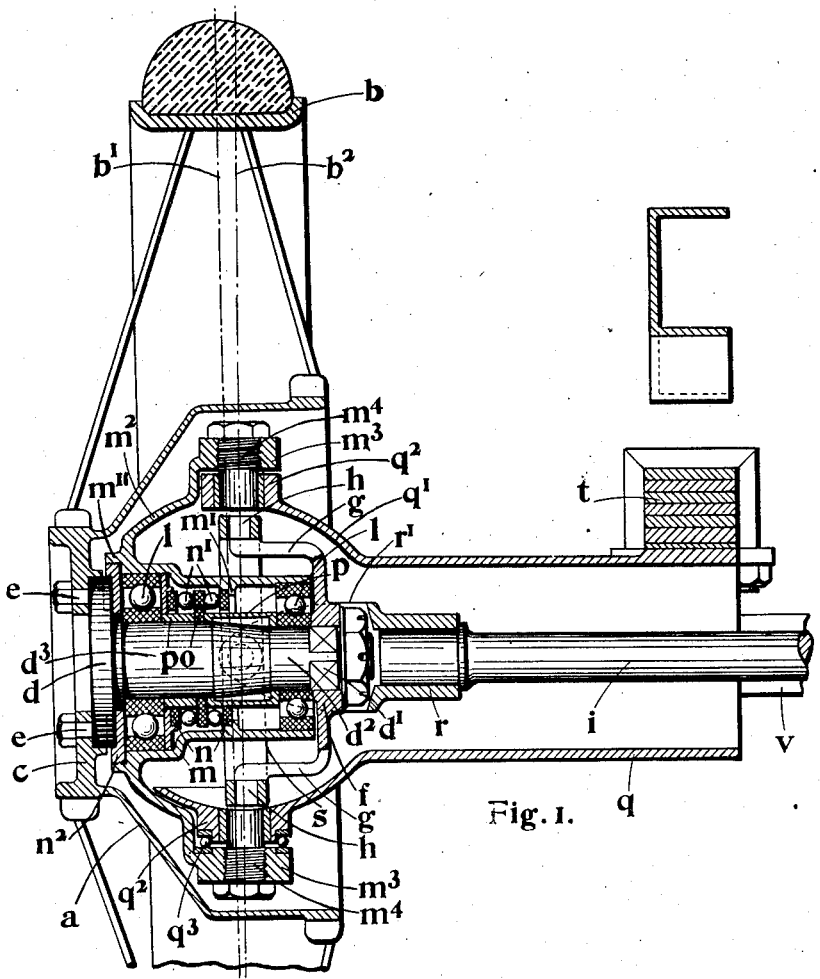
Figure 2:
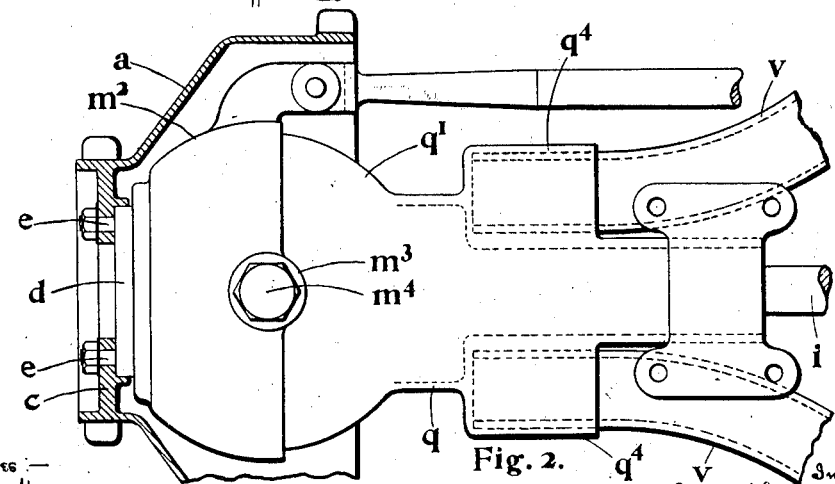

In the accompanying drawings,—Figure 1 is a sectional view, approximately through the axial center of the mechanism embodying my invention; Fig. 2 is a plan view of the same, the wheel hub being in section.

In carrying the invention into effect I provide a hub $a$ for the wheel $b$ with a face or a web $c$ on one side for the purpose of carrying the wheel spindle $d$ which is advantageously separately formed and secured to the web $c$ of the hub referred to by means of bolts $e$ or by any other suitable means, the spindle $d$ being so disposed as to extend in a middle position in the axial center of the wheel. The inner protruding extremity $d^1$ of the spindle $d$ has a square or irregular section for the reception of the boss $f$ of the arms $g$ $g$ of the universal joints $h$ of the universal shaft $i$ while near the outer extremity of the spindle $d$ a comparatively narrow cylindrical part $d^2$ is formed and near the web $c$ of the hub $a$ there is provided a cylindrical part $d^3$ of slightly larger diameter, and upon these respective cylindrical parts I mount rings forming ball races $l$ by means of which the stationary boss $m$ may be mounted upon the spindle $d$. This stationary boss $m$ is also set with rings at each end forming parts of the ball races $l$ these rings corresponding to those in the spindle for completing a ball bearing at each end of the spindle by means of which the weight may be distributed upon it in a position practically on each side of the center line $b^1$ or plane of the wheel. The stationary boss $m$ referred to may be provided with an inwardly protruding flange $m^1$ or flanges as a support or supports for a thrust ring or rings $n$ which by means of alternate sets of balls $n^1$ and rings may serve to take up the lateral thrust in one or both directions. A similar ring $o$ or rings or flange or flanges may be provided upon a sleeve $p$ or between two such sleeves mounted upon the spindle $d$, and may project between the respective rings $n$ forming the ball races as before described between which and the flange $m^1$ or flanges before referred to, balls $n^1$ are interposed to take up the lateral thrust. An adjusting ring $n^2$ is screwed into the outer flange $m''$ of the stationary boss $m$ which serves for taking up wear in the end thrust bearings $n^1$.

The boss $m$ referred to has surrounding it a flange $m^2$ which is integrally formed or cast and carried from the outer end of the boss and extends inwardly, and its inner extremity is provided with two bosses $m^3$ advantageously provided in diametrically opposite vertical positions for the reception of pins or bolts $m^4$ by means of which the weight may be taken from an inner ring or flange $q^1$ provided at the outwardly flaring extremity of a tubular supporting member $q$ through which the shaft $i$ passes. The flange $q^1$ at the extremity of the tubular member $q$ and which is disposed within the flange $m^2$ has bosses $q^2$ in diametrically opposite positions having holes for the reception of the pins $m^4$. The bosses $m^3$ $q^2$ come into alinement for the reception of the hinging pins $m^4$ disposed in diametrically opposite vertical positions. The lower boss $q^2$ has a ball race $q^3$ to form with a ball race provided upon the lower boss $m^3$, a ball bearing to facilitate relative movement of the parts. The flanges $q^1$ and $m^2$ are advantageously curved in opposite directions to form parts of a circle having its center at a point in which the plane of the wheel crosses its axial center or in which the vertical plane $b^2$ passing through the hinging pins $m^4$ crosses the axial center of the wheel, the plane $b^2$ meeting the plane $b^1$ of the wheel at the bearing point of the wheel. On an end of the shaft $i$, is a bifurcated connection, the arms $r^1$, of which are pivotally connected to a ring $s$ or part by means of which connection is made to the respective arms $g$, so that thus a universal joint connection $h$ is made, the center of the joint being situated in the plane $b^2$. The tubular supporting member $q$ carries at one extremity a spring $t$ by means of which the chassis is supported upon it. By such an arrangement a relatively small inclination results to the divided axle on the relative movement of the wheel that is to say by reason of the relatively great distance between the differential gear mounted upon the chassis and the center of the universal joint. The tubular member $q$ is rigidly connected to the corresponding tubular member of the opposite wheel by means of two tubular members V whose extremities fit into lugs $q^4$ provided integral with the tubular member $q$.

What I claim as my invention and desire to secure by Letters Patent is:—

In a motor vehicle, a combined driving and steering mechanism comprising a stub axle removably connected to the hub of a wheel, said stub axle having bearings thereon, said bearings being inclosed by a cylindrical member having a substantially conical extension, said extension being inclosed by said hub, a supporting member for the body of the vehicle, an end of said supporting member being inclosed by said extension and vertically journaled thereto, a ring encircling said cylindrical member, said ring constituting part of a universal joint, said universal joint being secured against rotation on said stub axle, a driving shaft secured to the universal joint, and an arm on said extension for steering the wheel.

In testimony whereof I have hereunto signed my name to this specification in the presence of two subscribing witnesses.

GEORGE WILLIAM MASCORD.

Witnesses:
LIONEL ERNEST BUSSEY,
H. D. JAMESON.